US010916050B1

United States Patent
Lin et al.

(10) Patent No.: US 10,916,050 B1
(45) Date of Patent: Feb. 9, 2021

(54) METHOD AND APPARATUS FOR SYNTHESIZING REALISTIC HAND POSES BASED ON BLENDING GENERATIVE ADVERSARIAL NETWORKS

(71) Applicant: TENCENT AMERICA LLC, Palo Alto, CA (US)

(72) Inventors: Shih-Yao Lin, Palo Alto, CA (US); Yusheng Xie, Mountain View, CA (US); Hui Tang, Mountain View, CA (US); Lianyi Han, Palo Alto, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/578,555

(22) Filed: Sep. 23, 2019

(51) Int. Cl.
*G06T 15/50* (2011.01)
*G06T 7/90* (2017.01)
*G06T 7/13* (2017.01)
*G06T 7/70* (2017.01)
*G06N 3/08* (2006.01)
*G06T 19/00* (2011.01)
*H04L 29/08* (2006.01)

(52) U.S. Cl.
CPC ............. *G06T 15/503* (2013.01); *G06N 3/08* (2013.01); *G06T 7/13* (2017.01); *G06T 7/70* (2017.01); *G06T 7/90* (2017.01); *G06T 19/00* (2013.01); *G06T 2207/20081* (2013.01); *G06T 2207/20084* (2013.01); *G06T 2207/30196* (2013.01); *G06T 2219/004* (2013.01); *H04L 67/10* (2013.01)

(58) Field of Classification Search
CPC ........... G06T 15/503; G06T 7/13; G06T 7/70; G06T 7/90; G06T 19/00; G06T 2207/20081; G06T 2207/20084; G06T 2207/30196; G06T 2219/004; G06N 3/08; H04L 67/10
See application file for complete search history.

(56) References Cited

U.S. PATENT DOCUMENTS

| | | | |
|---|---|---|---|
| 2013/0249786 A1* | 9/2013 | Wang | G06K 9/00389 345/156 |
| 2019/0278983 A1* | 9/2019 | Iqbal | G06K 9/6271 |
| 2020/0184721 A1* | 6/2020 | Ge | G06T 17/20 |

OTHER PUBLICATIONS

Liangjian Chen, Generating Realistic Training Images Based on Tonality-Alignment Generative Adversarial Networks for Hand Pose Estimation;Tencent Medical AI Lab; Research Center for Information Technology Innovation, Academia Sinica; last revised Dec. 20, 2018. (Year: 2018).*

Ashish Shrivastava; Learning From Simulated and Unsupervised Images Through Adversarial Training; Proceedings of the IEEE Conference on Computer Vision and Pattern Recognition (CVPR), 2017, pp. 2107-2116. (Year: 2017).*

(Continued)

*Primary Examiner* — Michael Le
(74) *Attorney, Agent, or Firm* — Sughrue Mion, PLLC (57) ABSTRACT

A method of synthesizing an image of a hand using a blending generative adversarial network (BlendGAN) includes obtaining a synthetic 3-dimensional (3D) hand pose including a 3D model of a hand; obtaining a real background image; combining the synthetic 3D hand pose with the real background image to create a synthetic hand image; and blending the synthetic hand image using the BlendGAN to create a blended synthetic hand image.

20 Claims, 5 Drawing Sheets

(56) References Cited

OTHER PUBLICATIONS

James S. Supancic III; Depth-based hand pose estimation: data, methods, and challenges; Proceedings of the IEEE International Conference on Computer Vision (ICCV), 2015, pp. 1868-1876. (Year: 2015).*

International Search Report and Written Opinion of the International Searching Authority dated Sep. 16, 2020, in International Application No. PCT/US/US2020/046347.

* cited by examiner

METHOD AND APPARATUS FOR SYNTHESIZING REALISTIC HAND POSES BASED ON BLENDING GENERATIVE ADVERSARIAL NETWORKS

BACKGROUND

Three-dimensional (3D) hand pose estimation from a single red, green, and blue (RGB) image is important but challenging due to the lack of sufficiently large hand pose datasets with accurate 3D hand keypoint annotations for training. Estimating hand poses from monocular RGB images has gained significant progress owing to the fast development of deep neural networks (DNN). These DNN-based methods learn hand representations and estimate poses jointly. Despite effectiveness, DNN-based methods highly rely on a vast amount of training data. However, it is expensive to collect all hand poses of interest with manual hand-keypoint annotations for training.

Recent work for hand pose estimation has trained the models on synthetic training data. For example, a synthetic hand pose dataset may be generated by an open source simulator, and serve as augmented training data to improve pose estimator learning. However, the synthetic hand images produced by the AR simulator look artificial, leading to limited performance gains. To address this issue, recent work leverages adversarial learning to enhance the quality of synthetic hand images.

Generating realistic images by using generative adversarial networks (GAN) has been a research trend. For example, a Pix2Pix Net has been used to learn mapping from a sketch to a realistic image, e.g. transferring a car sketch to a car image. Unlike GAN requiring paired training data, CycleGAN employs cycle-consistent adversarial networks for translating images from a source domain to a target domain with unpaired examples. To increase the amount of training data, SimGAN employs simulated and unsupervised learning to improve the realism of the output of a simulator with unlabeled real data. However, the simulator's data may include only objects, ignoring background scenes. Thus, the resulting synthetic images are filled objects, but the background information is usually crucial in practice.

Hand pose estimation has drawn increasing attention for decades. Research efforts can be categorized by their input data forms, which primarily include two-dimensional (2D) RGB images and 3D RGBD images with depth information. Recent progress has tried to estimate the 3D hand pose from a monocular RGB image. For example, a hand tracking approach based on particle swarm optimization has been proposed, as well as multiview bootstrapping to calculate hand keypoints from RGB images. Another proposal relates to a 3D pose regression net, enabling 3D hand pose estimation from an RGB image. However, there is a need for techniques that directly regularize the foreground (hand) and the background (natural scenes where the hand appears).

SUMMARY

In an embodiment, a method of synthesizing an image of a hand using a blending generative adversarial network (BlendGAN) may include obtaining a synthetic 3-dimensional (3D) hand pose including a 3D model of a hand; obtaining a real background image; combining the synthetic 3D hand pose with the real background image to create a synthetic hand image; and blending the synthetic hand image using the BlendGAN to create a blended synthetic hand image.

In an embodiment, a device for synthesizing an image of a hand using a BlendGAN may include at least one memory configured to store program code; and at least one processor configured to read the program code and operate as instructed by the program code, the program code including: first obtaining code configured to cause the at least one processor to obtain a synthetic 3D hand pose including a 3D model of a hand; second obtaining code configured to cause the at least one processor to obtain a real background image; combining code configured to cause the at least one processor to combine the synthetic 3D hand pose with the real background image to create a synthetic hand image; and blending code configured to cause the at least one processor to blend the synthetic hand image using the BlendGAN to create a blended synthetic hand image.

In an embodiment, a non-transitory computer-readable medium may store instructions, the instructions inclduing one or more instructions that, when executed by one or more processors of a device synthesizing an image of a hand using a BlendGAN, cause the one or more processors to obtain a synthetic 3-dimensional (3D) hand pose including a 3D model of a hand; obtain a real background image; combine the synthetic 3D hand pose with the real background image to create a synthetic hand image; and blend the synthetic hand image using the BlendGAN to create a blended synthetic hand image.

DETAILED DESCRIPTION

Embodiments of the present Specification relate to generating realistic hand poses. Existing algorithms for hand pose estimation can be greatly improved by augmenting training data with the generated hand poses, which come naturally with ground-truth annotations. Specifically, an augmented reality simulator may synthesize hand poses with accurate 3D hand-keypoint annotations. These synthesized hand poses may look unnatural and, and may not be adequate for training. Although the synthesized hand poses come with precise joint labels, they look unnatural and are not adequate for training.

To produce more realistic hand poses, embodiments as described herein relate to blending each synthetic hand pose with a real background and, developing blending generative adversarial networks (BlendGAN), which may align the tonality and color distributions between synthetic hand poses and real backgrounds, and can generate high-quality hand poses.

Figure 1:
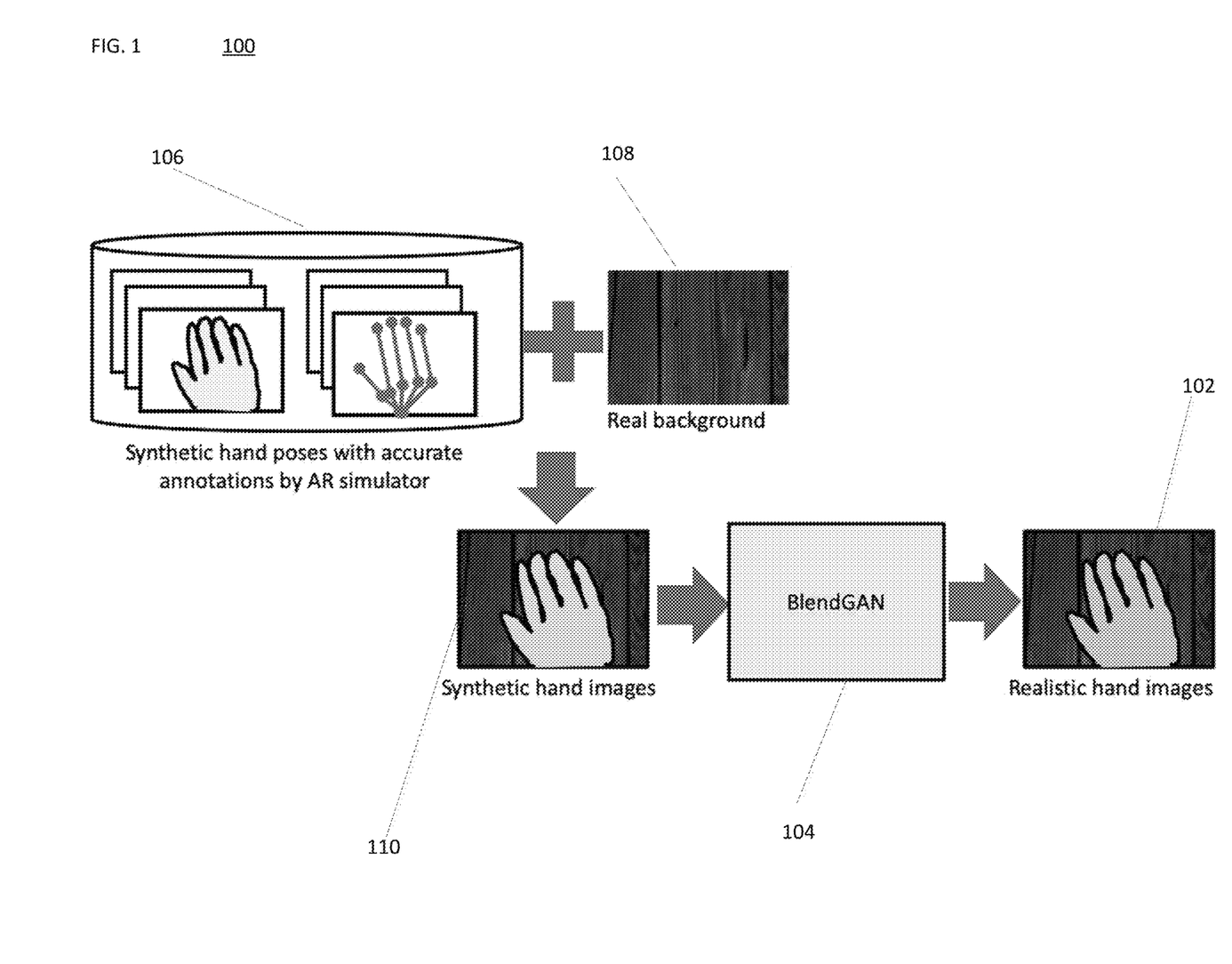
FIG. 1 is a diagram of an overview of an example implementation according to an embodiment.

FIG. 1 illustrates an overview of a process 100 synthesizing realistic hand pose images 102 using BlendGAN 104, according to an embodiment. As shown in FIG. 1, a synthetic hand pose 106 generated by an AR simulator is combined with a real background image 108 to yield a synthetic hand image 110, which is then fed to the Blend-GAN 104 to produce a more realistic hand image 102.

Accordingly, embodiments of the present Specification relate to fusing or combining synthetic hand poses 106 and real background images 108 so that the resulting synthesized hand images 110 can be more realistic. Next, BlendGAN 104 performs conditional adversarial learning and more seamlessly blends the synthetic hand poses 106 into the real background images 108 to create the realistic hand pose images 102. Existing pose estimators trained with the realistic hand pose images 102 may gain significant improvements over the current state-of-the-arts on both 2D and 3D datasets.

Therefore, embodiments described herein can align the tonality and color distributions between synthetic hand poses and real backgrounds, and can generate high-quality hand poses. Embodiments described herein may make synthetic training examples more realistic and reliable. Embodiments relating to the novel data augmentation scheme described herein can alleviate the problem of the hand-pose estimator training with the limited training data.

In this way, some implementations herein permit improvements in a hand pose estimation task. The results of processes such as process 100 align the hand shape and color tonality distribution between synthetic hand poses 106 and the real background images 108. Experimental results show that the state-of-the-arts hand pose estimators can be greatly improved with the aid of the training data generated by processes such as process 100.

Figure 2:
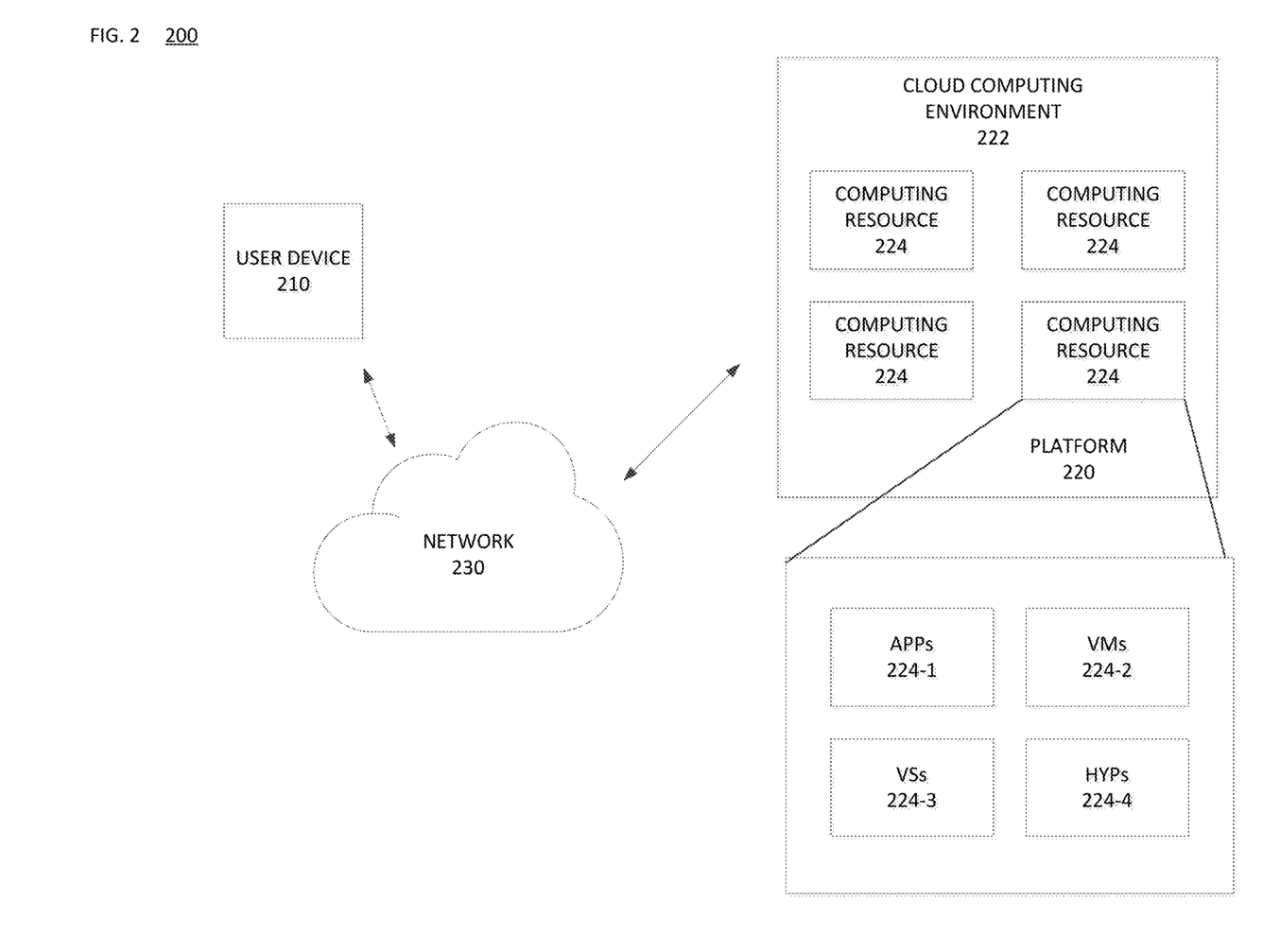
FIG. 2 is a diagram of an example environment in which systems and/or methods, may be implemented, according to an embodiment.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of synthesizing an image of a hand using BlendGAN, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
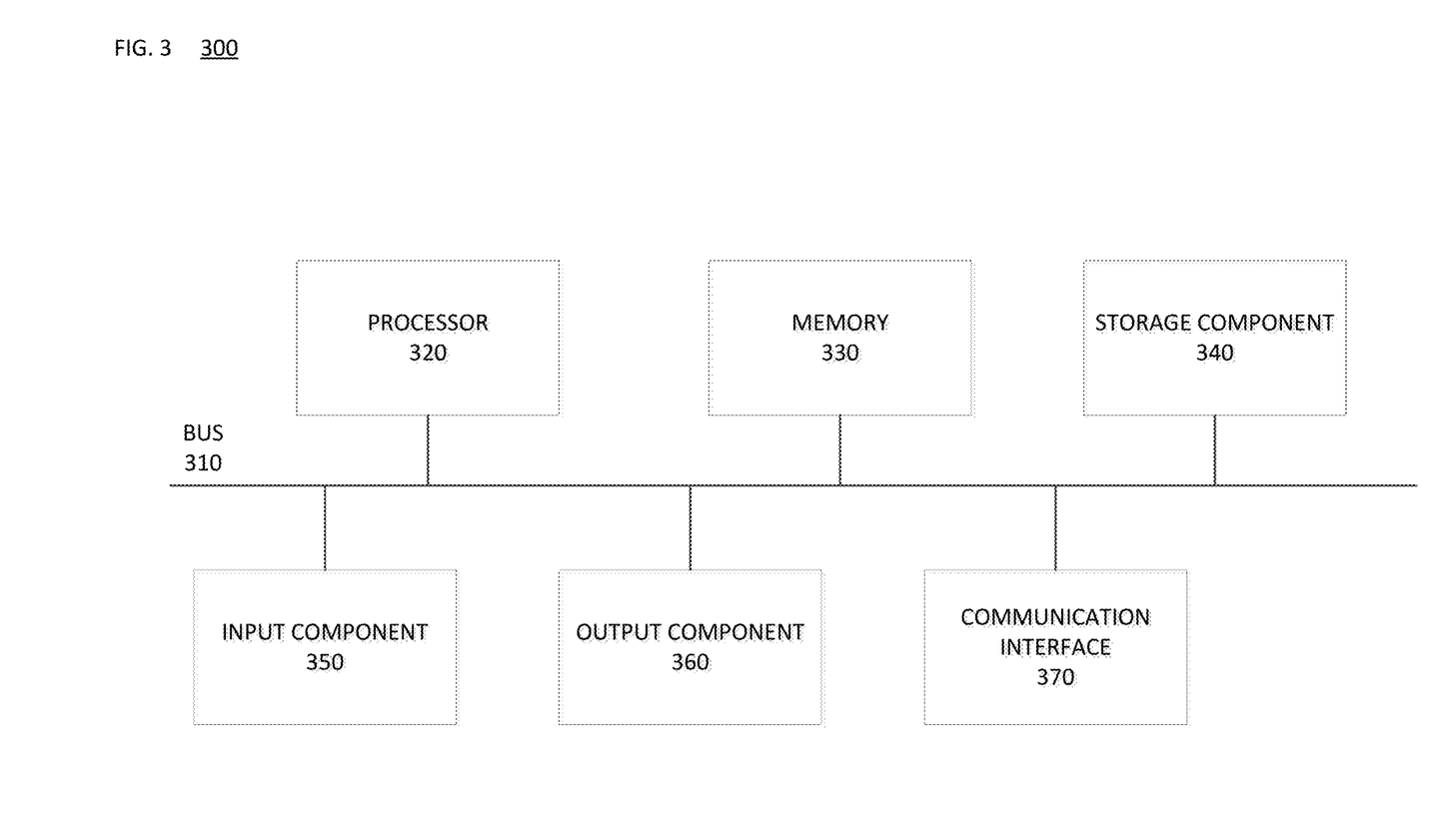
FIG. 3 is a diagram of example components of one or more devices of FIG. 2, according to an embodiment.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

As discussed above, Synthesizing training data has been a feasible way to tackle the lack of training data. Recent studies have adopted augmented reality (AR) simulators to generate large-scale training examples. In this way, many hand images with various poses, skin textures, and lighting conditions can be systematically synthesized. Moreover, accurate hand-keypoint annotations of these synthesized hand images are also available. Training with such synthetic images may not result in a much improved hand pose estimator because of the dissimilarity between the real and synthetic data. Therefore, as discussed above, exemplary embodiments relate to blending a synthetic hand pose image 106 in a foreground with a real background image 108 so that the blended images 102 are realistic enough to serve as high-quality training data.

Figure 4:
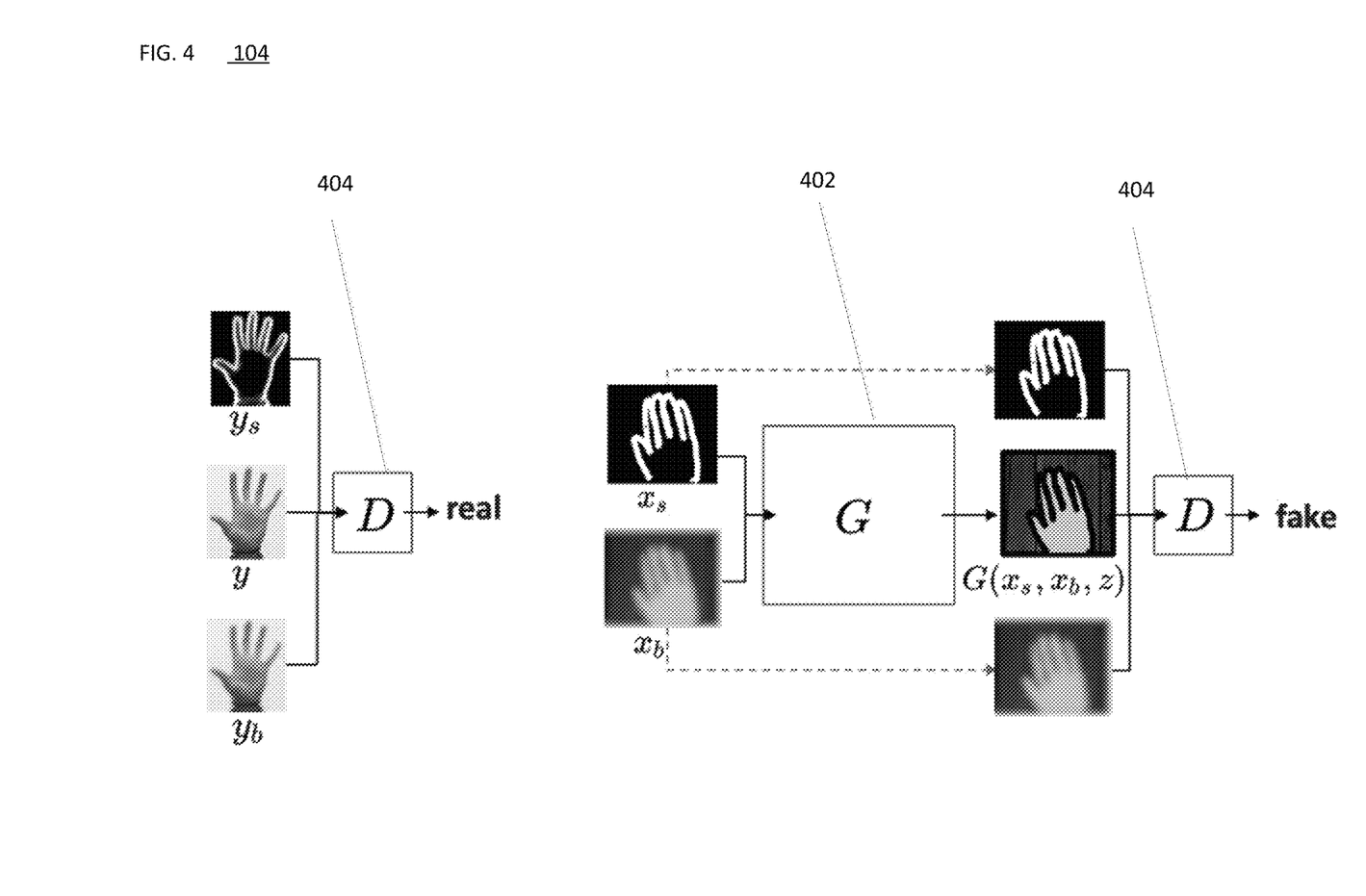
FIG. 4 is a diagram of an example implementation according to an embodiment.

Although data augmentation by using AR simulators can relieve the lack of training data, the background of the synthesized images is artificial. The background tonality and color distributions between the synthetic and real hand poses are inconsistent. These issues make the synthetic hand poses less qualified for being training data. A pix2pix net gives an example of leveraging the shape map to constrain the output image. Exemplary embodiments of the present Specification relate to using the BlendGAN 104 to take the color distribution and shape features into account.

FIG. 4 illustrates an example of a BlendGAN 104, according to an embodiment. Given a superposed image x, which may correspond to synthetic hand image 110 described above, a blur counterpart $x_b$ and shape map $x_s$ may be used as a color reference and a shape reference, respectively. The blurred counterpart in may be derived by applying an average filter to x, while the shape map $x_s$ may be obtained by using a holistically-nested edge detection (HED) detector. For the real image y, which may correspond to a real image of a real, non-synthetic hand, the same scheme may be used to extract a shape map $y_s$ a color maps $y_b$. The shape map $x_s$ and color map $x_c$ may be fed to both the generator 402 and the discriminator 404 as additional input layers such that the $x_s$, $x_b$, and the output $G(x_s, x_b, z)$ are transformed into a joint hidden representation.

BlendGAN derives a mapping from the shape map $x_s$ and the color map $x_b$ to the generated image $G(x_s, x_b, z)$. The generator 102, which may be denoted as G, learns to produce realistic images to fool the discriminator 104, which may be denoted as D, by blending a synthetic hand pose, for example synthetic hand pose image 106, with a real background image, for example real background image 108, while the discriminator 104 aims to separate fake or synthetic images from real images.

During training, the BlendGAN 104 learns a mapping from $x_s$, $x_b$, and a random vector z to the generated output y, i.e., $G:\{x_s, x_b, z\} \rightarrow y$. The objective of BlendGAN 104 may be designed as Equation 1, inset below $$L_{TAGAN}(G,D) = E_{y_s,y_b,y}[\log D(y_s,y_b,y)] + E_{x_s,x_b,z}[\log(1-D(x_s,x_b,G(x_s,x_b,z)))] \quad (1)$$

The generator 402, represented as G, in BlendGAN 104 may be optimized using Equation 2, inset below:

$$G^* = \arg \min_G \max_D L_{TAGAN}(G,D) + L_{TA}(G,x_s,x_b) \quad (2)$$

where $\mathcal{L}_{TA}$ represents the loss function for enforcing the shape similarity between $x_s$ and y as well as the color consistency between $x_b$ and y. The loss may be defined by Equation 3, inset below:

$$L_{TA}(G) = E_{x_s,x_b,z}[\lambda_1 * D_c(x_b,x_s,z,y) + \lambda_1 * D_s(x_b,x_s,z,y)] \quad (3)$$

where Dc (.) and Ds (.) may denote the color and shape distance functions, respectively. Constants $\lambda 1$ and $\lambda 2$ may be the weights. The shape distance function Ds may be expressed as Equation 4, inset below:

$$D_s(x_b,x_s,z,y) = \|y - G(x_b,x_s,z)\| \quad (4)$$

In addition to the shape condition, a tonality-alignment loss may be used to align the color distributions of the input and the generated images via defining $D_c$ as Equation 5, inset below $$D_c(x_b, x_s, z, y) = -\sum_i h_g(i) \log\left(\frac{h_y(i)}{h_g(i)}\right) \quad (5)$$

where $h_y$ and $h_g$ represent the color histograms of y and $G(x_b, x_s, z)$, respectively. Thereby, $D_c$ (•) may be the Kullback-Leibler divergence between the two histograms.

Figure 5:
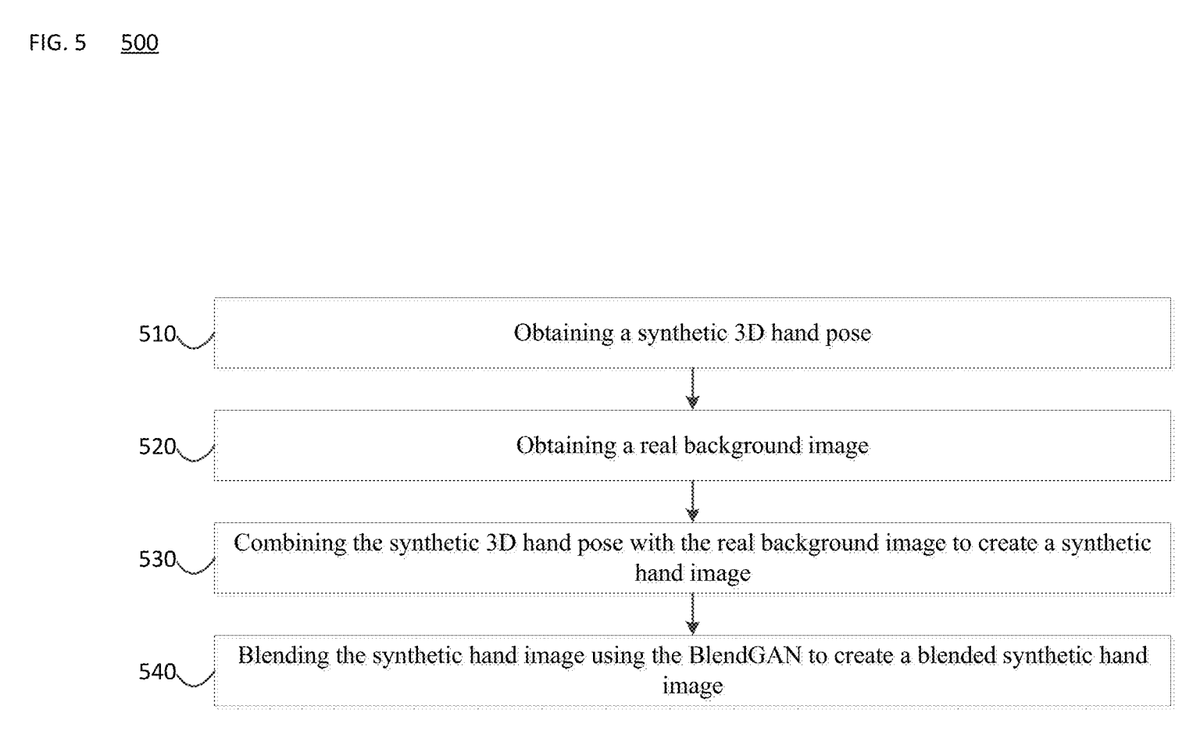
FIG. 5 is a flow chart of an example process for synthesizing an image of a hand using a BlendGAN, according to an embodiment.

FIG. 5 is a flow chart of an example process 500 for synthesizing an image of a hand using a BlendGAN, for example BlendGAN 104. In some implementations, one or more process blocks of FIG. 5 may be performed by platform 220. In some implementations, one or more process blocks of FIG. 5 may be performed by another device or a group of devices separate from or including platform 220, such as user device 210.

As shown in FIG. 5, process 500 may include obtaining a synthetic 3D hand pose, for example synthetic hand pose 106, including a 3D model of a hand (block 510).

As further shown in FIG. 5, process 500 may include obtaining a real background image, for example real background image 108 (block 520).

As further shown in FIG. 5, process 500 may include combining the synthetic 3D hand pose with the real background image to create a synthetic hand image, for example synthetic hand image 110 (block 530).

As further shown in FIG. 5, process 500 may include blending the synthetic hand image using the BlendGAN, for example BlendGAN 104, to create a blended synthetic hand image, which may correspond with, for example, realistic hand pose image 102 (block 540).

In an embodiment, the blended synthetic hand image may be included in a plurality of blended synthetic hand images, and process 500 may further include training a hand pose estimation algorithm using the plurality of blended synthetic hand images.

In an embodiment, the synthetic 3D hand image may include 3D hand-keypoint annotations, and the real background image may be obtained from a still image such as a photograph.

In an embodiment, the BlendGAN may include a generator algorithm, for example generator 402, and a discriminator algorithm, for example discriminator 404.

In an embodiment, the color map of the real hand image may be created by applying an average filter to the real hand image, and the color map of the synthetic hand image may be created by applying the average filter to the synthetic hand image.

In an embodiment, the shape map of the real hand image may be created by performing holistically-nested edge detection on the real hand image, and the shape map of the synthetic hand image may be created by performing the holistically-nested edge detection on the synthetic hand image.

Although FIG. 5 shows example blocks of process 500, in some implementations, process 400 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of synthesizing an image of a hand using a blending generative adversarial network (BlendGAN), the method comprising:
    obtaining a synthetic 3-dimensional (3D) hand pose comprising a 3D model of a hand;
    obtaining a real background image;
    combining the synthetic 3D hand pose with the real background image to create a synthetic hand image; and
    blending the synthetic hand image using the BlendGAN to create a blended synthetic hand image,
    wherein an objective of the BlendGAN is determined based on a real hand image, a shape map of the real hand image, a color map of the real hand image, a shape map of the synthetic hand image, and a color map of the synthetic hand image.

2. The method of claim 1, wherein the blended synthetic hand image is included in a plurality of blended synthetic hand images, and
    wherein the method further comprises training a hand pose estimation algorithm using the plurality of blended synthetic hand images.

3. The method of claim 1, wherein the synthetic 3D hand pose comprises 3D hand-keypoint annotations, and
    wherein the real background image is obtained from a photograph.

4. The method of claim 1, wherein the BlendGAN comprises a generator algorithm and a discriminator algorithm.

5. The method of claim 4, wherein the objective of the BlendGAN is defined as follows:

$$L_{TAGAN}(G,D) = E_{y_s,y_b,y}[\log D(y_s,y_b,y)] + E_{x_s,x_b,z}[\log(1-D(x_s,x_b,G(x_s,x_b,z)))],$$

wherein $L_{TAGAN}$ represents the objective, G represents the generator algorithm, D represents the discriminator algorithm, E represents an expectation function, y represents the real hand image, $y_s$ represents the shape map of the real hand image, $y_b$ represents the color map of the real hand image, $x_s$ represents the shape map of the synthetic hand image, $x_b$ represents the color map of the synthetic hand image, and z represents a random vector.

6. The method of claim 1, wherein the color map of the real hand image is created by applying an average filter to the real hand image, and
    wherein the color map of the synthetic hand image is created by applying the average filter to the synthetic hand image.

7. The method of claim 1, wherein the shape map of the real hand image is created by performing holistically-nested edge detection on the real hand image, and
    wherein the shape map of the synthetic hand image is created by performing the holistically-nested edge detection on the synthetic hand image.

8. The method or claim 1, wherein the objective comprises a generator algorithm, and
    wherein the generator algorithm is optimized as follows:

$$G^* = \arg\min_G \max_D L_{TAGAN}(G, D) + L_{TA}(G, x_s, x_b),$$

wherein $L_{TA}$ represents a loss function, $L_{TAGAN}$ represents the objective, G represents the generator algorithm, D represents a discriminator algorithm, $x_s$ represents the shape map of the synthetic hand image, and $x_b$ represents the color map of the synthetic hand image.

9. The method of claim 8, wherein the loss function is defined as follows:

$$L_{TA}(G) = E_{x_s,x_b,z}[\lambda_1 * D_c(x_b,x_s,z,y) + \lambda_1 * D_s(x_b,x_s,z,y)]$$

wherein Dc represents a color distance function, Ds represents a shape distance function, $\lambda_1$ represents a first weight, and $\lambda_2$ represents a second weight.

10. The method of claim 9, wherein the shape distance function is represented as follows:

$$D_s(x_b,x_s,z,y) = \|y - G(x_b,x_s,z)\|, \text{ and}$$

wherein the color distance function is represented as follows:

$$D_c(x_b, x_s, z, y) = -\sum_i h_g(i) \log\left(\frac{h_y(i)}{h_g(i)}\right),$$

wherein $h_y$ represents a color histogram of the real hand image, and $h_g$ represents a color histogram of $G(x_b, x_s, z)$.

11. A device for synthesizing an image of a hand using a blending generative adversarial network (BlendGAN), the device comprising:
    at least one memory configured to store program code; and
    at least one processor configured to read the program code and operate as instructed by the program code, the program code including:
    first obtaining code configured to cause the at least one processor to obtain a synthetic 3-dimensional (3D) hand pose comprising a 3D model of a hand;
    second obtaining code configured to cause the at least one processor to obtain a real background image;
    combining code configured to cause the at least one processor to combine the synthetic 3D hand pose with the real background image to create a synthetic hand image;

blending code configured to cause the at least one processor to blend the synthetic hand image using the BlendGAN to create a blended synthetic hand image, wherein an objective of the BlendGAN is determined based on a real hand image, a shape map of the real hand image, a color map of the real hand image, a shape map of the synthetic hand image, and a color map of the synthetic hand image.

12. The device of claim 11, wherein the blended synthetic hand image is included in a plurality of blended synthetic hand images, and wherein the program code further comprises training code configured to cause the at least one processor to train a hand pose estimation algorithm using the plurality of blended synthetic hand images.

13. The device of claim 11, wherein the synthetic 3D hand pose comprises 3D hand-keypoint annotations, and wherein the real background image is obtained from a photograph.

14. The device of claim 11, wherein the BlendGAN comprises a generator algorithm and a discriminator algorithm.

15. The device of claim 14, wherein the objective of the BlendGAN is defined as follows:

$$L_{TAGAN}(G,D)=E_{y_s,y_b,y}[\log D(y_s,y_b,y)]+E_{x_s,x_b,z}[\log(1-D(x_s,x_b,G(x_s,x_b,z))],$$

wherein $L_{TAGAN}$ represents, G the generator algorithm, D represents the discriminator algorithm, E represents an expectation function, y represents the real hand image, $y_s$ represents the shape map of the real hand image, $y_b$ represents the color map of the real hand image, $x_s$ represents the shape map of the synthetic hand image, $x_b$ represents the color map of the synthetic hand image, and z represents a random vector.

16. The device of claim 11, wherein the color map of the real hand image is created by applying an average filter to the real hand image, and wherein the color map of the synthetic hand image is created by applying the average filter to the synthetic hand image, wherein the shape map of the real hand image is created by performing holistically-nested edge detection on the real hand image, and wherein the shape map of the synthetic hand image is created by performing the holistically-nested edge detection on the synthetic hand image.

17. The device claim 11, wherein the objective comprises a generator algorithm, and wherein the generator algorithm is optimized as follows:

$$G^* = \underset{G}{\arg\min}\underset{D}{\max} L_{TAGAN}(G, D) + L_{TA}(G, x_s, x_b),$$

wherein $L_{TA}$ represents a loss function, $L_{TAGAN}$ represents the objective, G represents the generator algorithm, D represents a discriminator algorithm, $x_s$ respresents the shape map of the synthetic hand image, and $x_b$ represents the color map of the synthetic band image.

18. The device of claim 17, wherein the loss function is defined as follows:

$$L_{TA}(G)=E_{x_s,x_b,z}[\lambda_1 *D_c(x_b,x_s,z,y)+\lambda_1 *D_s(x_b,x_s,z,y)]$$

wherein Dc represents a color distance function, Ds represents a shape distance function, $\lambda_1$ represents a first weight, and $\lambda_2$ represents a second weight.

19. The device of claim 18, wherein the shape distance function is represented as follows:

$$D_s(x_b,x_s,z,y)=\|y-G(x_b,x_s,z)\|, \text{ and}$$

wherein the color distance function is represented as follows:

$$D_c(x_b, x_s, z, y) = -\sum_i h_g(i)\log\left(\frac{h_y(i)}{h_g(i)}\right),$$

wherein $h_y$ represents color histogram of the real hand image, and $h_g$ represents a color histogram of $G(x_b, x_s, z)$.

20. A non-transitory computer-readable medium storing instructions, the instructions comprising: one or more instructions that, when executed by one or more processors of a device synthesizing an image of a hand using a blending generative adversarial network (BlendGAN), cause the one or more processors to:

obtain a synthetic 3-dimensional (3D) hand pose comprising a 3D model of a hand;

obtain a real background image;

combine the synthetic 3D hand pose with the real background image to create a synthetic hand image; and blend the synthetic hand image using the BlendGAN to create a blended synthetic hand image, wherein an objective of the BlendGAN is determined based on a real hand image, a shape map of the real hand image, a color map of the real hand image, a shape map of the synthetic hand image, and a color map of the synthetic hand image.

* * * * *